Dec. 30, 1947.  P. W. JOHNSON  2,433,516
SNAP TYPE GAGE
Filed June 14, 1943
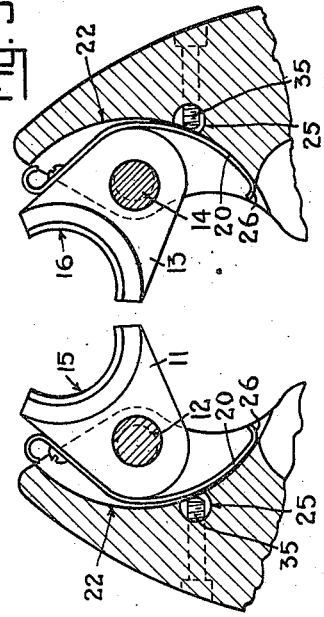
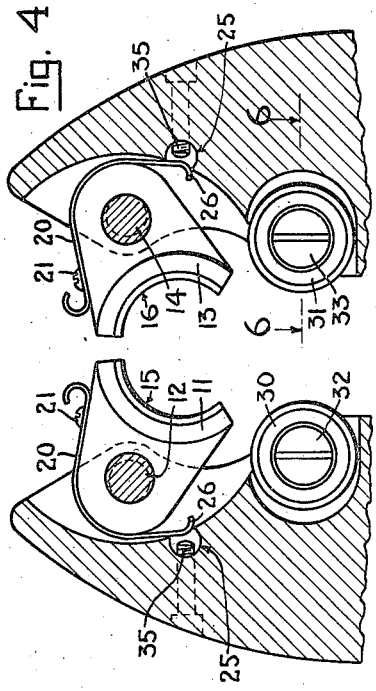
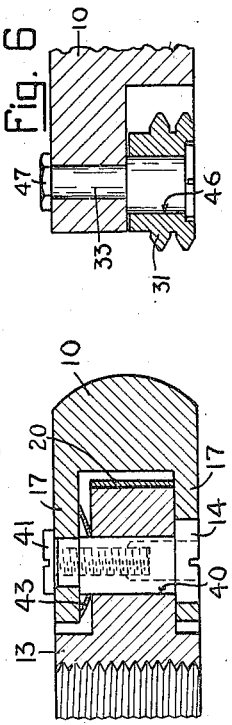
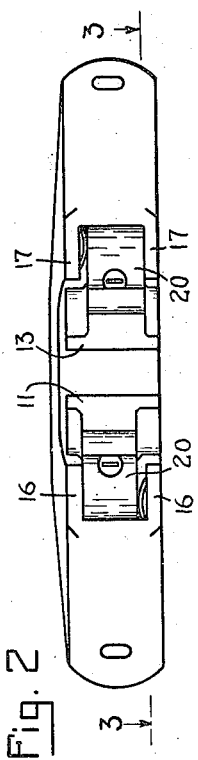
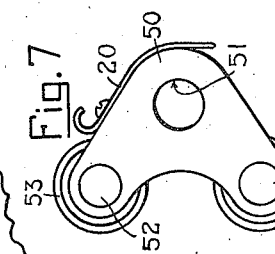
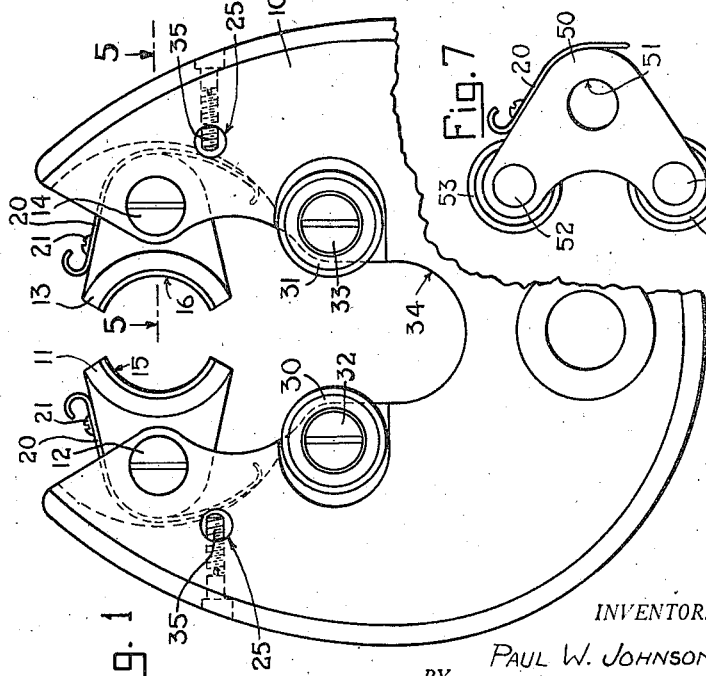
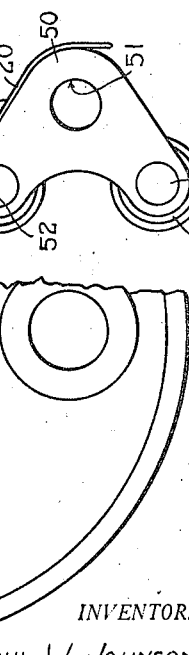
INVENTOR.
PAUL W. JOHNSON
BY Bohleber, Fassett + Montstream
ATTORNEYS Patented Dec. 30, 1947

2,433,516

UNITED STATES PATENT OFFICE 2,433,516

SNAP TYPE GAGE

Paul W. Johnson, Hartford, Conn.

Application June 14, 1943, Serial No. 490,720

25 Claims. (Cl. 33—199)

The invention relates to a gage by means of which the accuracy of a round or cylindrical piece and particularly of an external thread may be tested. In order to adequately test the concentricity, diameter, pitch and other thread elements and conditions, it is customary to use a ring gage into which the threaded part to be tested is fully threaded. Testing with the usual ring gage, therefore, involves a relatively long period of time as compared with the time to snap test a piece and in addition a ring gage is subject to considerable wear. The ring gage of the invention provides one which constitutes a ring gage of the snap type in that the test piece is laterally passed to or through gaging position between gaging members in the same manner that a limit gage is used. The snap ring gage may be used alone but preferably it will be mounted in conjunction with a not-go gage to test the minimum allowable pitch diameter of the external thread. This application is a continuation in part of my application Serial Number 480,135, filed March 23, 1943, which has been abandoned.

It is an object of the invention to construct a ring gage for an external screw thread which gages the thread under examination for all the elements for which a customary ring gage is utilized but is constructed so that it is a snap type of thread ring gage.

Another object of the invention is to construct a snap type thread ring gage which can be used to test the thread upon a piece mounted between centers without removing the same from between the centers.

Another object is to construct a segmental ring gage for testing a cylindrical or any round piece.

A still further object of the invention is to construct a combination of thread gage having a snap type ring gage and a not-go gage for testing the minimum allowable pitch diameter of an external thread.

Another object is to construct a gage and particularly a thread gage having convex gaging elements which will test for concentricity.

Other objects of the invention will be more apparent from the following description taken in connection with the accompanying drawing illustrating a preferred embodiment thereof in which:

Figure 1 is a plan view of the gage with the snap type ring gage in gaging position.

Figure 2 is a plan view of the gage.

Figure 3 is a partial view of the gage showing the snap type ring gage in position to receive a thread to be tested.

Figure 4 is a partial view of the gage showing the snap type ring gage in exit position to permit the test thread to be passed to the not-go gage.

Figure 5 is a section taken on line 5—5 of Figure 1 showing an adjustable mounting for a ring gage segment or member.

Figure 6 is a section taken on line 6—6 of Figure 4 showing an adjustable mounting for one of the not-go gage elements.

Figure 7 is a view of a pivoted segment carrying a pair of gaging rollers.

The gage includes a stock or frame 10 of general U-shaped construction so that the frame has two arms. A snap type ring gage member or segment 11 is mounted upon a pivot 12 in one arm of the frame and a cooperating or complementary ring gage member 13 is mounted upon a pivot 14 in the other arm in cooperative relation with the other member. Each ring gage member has a concave gaging surface 15 and 16 respectively which may be smooth for testing a round, such as a cylindrical piece or may have an axial sectional outline of different radial dimensions which outline continues circumferentially or may have particularly threads for testing the accuracy of an external thread. The pivot 12 is retained in spaced flanges 16 formed in one arm of the frame and the pivot 14 is retained in flanges 17 formed in the other arm thereof.

Suitable means may be used to retain the ring gage members in open position and return the same to that position as shown in Figure 3. The means particularly illustrated includes a spring 20 for each member having one end secured thereto in any suitable fashion such as by a screw 21. Each spring is normally a straight spring with one end secured to the member and the other end being free so that it slides along a surface 22 in the frame whereby the spring is tensioned throughout the movement of the spring and the gage member or segment and normally impels its respective member to the position shown in Figure 3. The surface 22 preferably is arcuate so that the spring has ample tension throughout the movement of the spring and member.

The ring gage segments or members are wide enough so that the thread to be tested is not only gaged as to its go diameter but also is tested as to its pitch, concentricity and thread deformity. An inspector testing a thread or cylindrical piece will insert the test piece between the members in the position shown in Figure 3 and press the test piece downwardly to or preferably through the position shown in Figure 1 which is the gaging position and if the test piece is satisfactory it will pass on downwardly swinging the ring gage members to the position shown in Figure 4. When the test thread has passed through the ring gage members the springs 20 impel the same to the open or receiving position shown in Figure 3. The test piece may then be removed axially from the gage.

The snap ring gage is also suitable for gaging the thread upon a piece mounted in a machine between centers without removing the same from therebetween. This is desirable where a workman is turning a thread upon a lathe and wishes to gage the thread without removing the same from between the centers. In order to accomplish this result, means are provided to retain the gage members in exit position after the test thread has passed therebetween. Any suitable construction may be used for this purpose that particularly shown including a recess 25 in the arcuate surface which may be formed by a hole 25 through each arm of the frame which cuts into the arcuate surface 22. The free end 26 of each spring 20 engages in its recess when the members are in exit position so that the spring end 26 is removable or resiliently retained therein and hence the ring gage members are resiliently held in exit position as shown in Figure 4. The means illustrated and described, therefore retain the gaging member or members in entrance and exit positions.

In testing a thread upon a test piece mounted between machine centers, the workman takes the gage and passes it through the gage member or segments. Normally the members would return to their open or entrance position of Figure 3 after the test thread has passed therethrough under the influence of the springs 20. If this should occur, the test piece would have to be removed from between the machine centers in order to withdraw the gage axially along the test piece. However, when the spring ends 26 engage in the recesses formed by the holes 25 the gage members are held in exit position and the gage may be removed from the test piece merely by withdrawing the gage therefrom. The pressure of the test piece upon the gage members springs the end 26 of each spring out of its recess and permits the removal of the gage therefrom.

For gaging threads not mounted between centers, it is not desirable to retain the gage members in exit position. Means are provided therefore to render inoperative or ineffective the means for retaining the ring gage members in exit position or the position shown in Figure 4. This means includes a screw 35 for each recess 25 which is threaded into the frame so that the screw end may be adjusted or advanced to the position shown in Figure 1 in which position its end comes into alignment or approximate alignment with the arcuate surface 22 and thereby renders the recess ineffective.

The segmental ring gage may be utilized alone but preferably it is used in conjunction with a not-go gage. The not-go gage may be of any kind or style, that illustrated including a pair of thread gage rollers 30 and 31 which are mounted upon suitable pivots 32 and 33. The not-go rollers test the pitch diameter of a screw thread so that a screw thread of the proper pitch diameter will not pass between the rollers and for this purpose the roller 30 may be a cone roller having a single ridge or rib and the roller 31 may be a V-roller having a double or two gaging ridges or ribs to engage the inner flanks of the thread. If, however, the pitch diameter of the thread being tested is too small, the threaded test piece will pass between the rollers and into the recess 34 and then may be removed axially from the gage. If the thread being tested is within the allowable tolerances it will pass through the segmental ring gage, the gage members of which will snap back to the position shown in Figure 3 but will not pass between the not-go rollers whereupon the threaded test piece may be removed axially through the space between the ring gage members and the not-go rollers. A thread to be gaged upon a piece mounted between centers of a machine may be tested by the segmental ring gage and also by the not-go gage without removing the same from between centers in the same manner as heretofore described. If the thread being tested should be too small and pass through the not-go gage rollers, the gage is withdrawn in reverse direction through the not-go rollers and the segmental ring gage, the latter being resiliently retained in exit position.

Preferably at least one of the ring gage members is adjustable towards and from the other and for maximum adjustment the position of both members is made adjustable. This adjustment may be accomplished in any known way although adjustment through their respective pivots 12 and 14 is perhaps the simplest method. The pivot has a portion 40 upon which the ring gage member 13 is mounted which is eccentric with respect to the pivot bearings received in the flanges 17. A screw 41 clamps the pivot 14 to a flange 17 between the head of the screw and a shoulder formed by the eccentric portion of the pivot. Rotation of the pivot 14 turns the eccentric portion and thereby adjusts the position of the gage member 13 with respect to the gage member 11.

When testing threaded parts of cylindrical form, the position of the gage threads or ridges with respect to the test part in each respective pivoted ring segment or gage member moves from the position shown in Figure 3 to the position shown in Figure 4. The gage member, therefore, follows the helix angle of the test part, particularly for a steep angle thread or a thread having a large helix angle. For such steep angle threads, provision must be made for lateral shifting of at least one ring gage member. This may be provided for in the mounting of the gage member upon the frame. The mounting particularly shown provides for lateral movement of the member upon the eccentric portion 40 of the pivot as shown in Figure 5. Any suitable means may be utilized for retaining the respective member in one lateral position the means illustrated uses a spring washer 43 which is located between the member and a flange of the frame. For maximum lateral movement, each gage member is movable laterally and is impelled towards opposite sides of the frame. For a 60° angle thread, of standard pitch, in which the helix angle is relatively not great, the angle of the thread provides enough relief so that provision for axial shift of the gage member is not essential. Any slight axial shifting that may occur is taken care of by the freedom customarily allowed between the frame and a movable part such as the gage member. Although not essential, provision may be made for axial freedom or shifting.

Preferably one or both of the not-go gage rollers 32 and 33 may be adjustable. Any suitable adjusting means may be provided that particularly illustrated being through the respective pivot. The pivot 33 is provided with an eccentric portion 46 upon which the gaging roller is mounted. Rotation of the pivot adjusts the roller towards or away from the other roller. A nut 47 upon the end of the pivot clamps the pivot in adjusted position to a flange between a shoulder formed by the eccentric portion and the nut.

Although the preferred form of construction utilizes pivoted segments or members having gaging means in the form of concave gaging portions, the construction may be used with convex gaging portions as shown in Figure 7. The pivoted member 50 has a pivot bearing 51 to receive a pivot pin upon a gage frame similar to the pivot pin 14 upon frame 10. The pivoted member may carry one or more gaging means although preferably it has two. The pivoted member may have two arms, one arm carrying a pivot pin 52 upon which is mounted a gaging roller 53 and the other arm carrying a similar pivot pin 54 upon which is rotatably mounted a gaging roller 55. It is clear that any suitable gaging element may be used although the roller is the preferred form and for gaging a thread, the rollers will carry thread engaging ribs. A spring like the spring 20 of Figure 1 may be used to swing the segment to open position.

The pivoted member in one arm of the frame with its gaging element or elements may be used with a cooperating fixed gaging element or roller carried in the other arm of the frame in which case the piece or thread to be tested comes into contact with the gaging elements at three points or lines on its periphery. This enables the piece or thread to be tested for concentricity which would probably escape detection in a two point or line gage. If desired two pivoted segments like the segment 50 may be mounted opposite each other in each arm of a frame in which case a four point contact with the thread being tested would be obtained thereby giving a more effective test for an out-of-round condition. It is clear that instead of using gaging rollers, fixed convex gaging elements may be used. The pivoted member of Figure 7 utilizing convex gaging surfaces may be used alone or with not-go rollers like the gaging rollers 30—31 of Figure 1. Where so used however, the distance between the pivot for the pivoted member and the pivot for the not-go rollers should be increased in order to provide ample space for the movement of the pivoted member.

The gage described herein is of the snap type but distinguishes over the usual snap type gage having two gaging rollers. The latter gage gives line contact at two points only on the periphery of the test piece or thread whereas the gage described herein in the form illustrated in Figure 7 gives line contact at three or four points on the periphery and the gage of Figures 1-6 gives circumferential contact over an extent of the thread being tested depending upon the size of the concave gaging portion. The concave gaging portion or means provides for contact with the test piece at many points. Complete circumferential contact is not possible, however, with concave gaging portions of maximum size, very nearly complete circumferential contact can be achieved.

This invention provides an improvement in a gage. It is understood that various modifications in structure, as well as changes in mode of operation, assembly, and manner of use, may and often do occur to those skilled in the art, especially after benefiting from the teachings of an invention. This disclosure illustrates the preferred means of embodying the invention in useful form.

What is claimed is:

1. A gage comprising a frame, a pair of complementary gage members each having a concave gaging portion, means pivotally supporting each member at spaced points so that the concave gage members pivot away from each other to open the same for insertion of a part to be gaged and pivot towards each other into gaging position, each pivotal supporting means supporting its gage member for free pivotal movement thereof in both directions by manual pressure exerted on the gage member, and the pivotal means supporting the gaging members in a position when in use so that the gaging portions are incapable of passing an oversize piece to gaging position.

2. A gage comprising a frame, a pair of complementary gage members each having a concave gaging portion and means pivotally supporting each member at spaced points so that the concave gage members pivot away from each other in one direction to open the same for insertion of a part to be gaged then pivot towards the other in the other direction into gaging position and beyond to release the gaged part, each pivotal supporting means supporting its gage member for free pivotal movement thereof in both directions by manual pressure exerted on the gage member, and the pivotal means supporting the gaging members in a position when in use so that the gaging portions are incapable of passing an oversize piece to gaging position.

3. A gage comprising a frame, a pair of complemental gage members each having a concave gaging portion, means pivotally supporting each gage member at spaced points so that the concave gage members pivot away from each other to open the same for insertion of a part to be gaged and pivot towards each other into gaging position, and means normally retaining the gage members in open position.

4. A thread ring gage comprising a frame, a pair of complementary gage members each having a threaded concave gaging portion, and means pivotally supporting each member at spaced points so that the concave gaging portions pivot away from each other to open the same for insertion of a thread to be gaged and pivot towards each other in a reverse direction into gaging position.

5. A thread ring gage comprising a frame, a pair of complementary gage members each having a threaded concave gaging portion, and means pivotally supporting each member at spaced points so that concave gaging portions pivot away from each other in one direction to open the same for insertion of a thread to be gaged and pivot towards each other in the other direction through gaging position and beyond to release the gaged part on the other side thereof.

6. A thread ring gage comprising a frame, a pair of complementary gage members each having a threaded concave portion, means pivotally supporting each gage member at spaced points so that the concave gaging portions pivot away from each other to open the same for insertion of a thread to be gaged and pivot towards each other in a reverse direction into gaging position, and means normally retaining the gage members in open position.

7. A thread ring gage comprising a frame, a pair of complemental gage members each having a threaded concave gaging portion, and mounting means carried by the frame and pivotally supporting each member at spaced points so that the concave gaging portions pivot away from each other to open the same for insertion of a thread to be gaged and pivot towards each other in a reverse direction into gaging position, and at least one member being so mounted that it is free for lateral movement relatively to the other.

8. A thread ring gage comprising a frame, a pair of complementary gage members each having a threaded concave gaging portion, means carried by the frame and pivotally supporting each member at spaced points so that concave gaging portions pivot away from each other in one direction to open the same for insertion of a thread to be gaged and pivot towards each other in the other direction at least to gaging position, and means for at least one of the gaging members resiliently engaging the same so that it is free for lateral movement thereof upon the pivot.

9. A thread ring gage comprising a frame, a pair of complementary gage members each having a threaded concave portion, means carried by the frame and pivotally supporting each gage member at spaced points so that the concave gaging portions pivot away from each other to open the same for insertion of a thread to be gaged and pivot towards each other in a reverse direction through gaging position and beyond to exit position to release the gaged part on the other side thereof, means normally retaining the gage members in open position, and means retaining the gaging members in exit position.

10. A thread ring gage comprising a frame, a pair of complementary gage members each having a threaded concave gaging portion, means pivotally supporting each member at spaced points so that the concave gaging portions pivot away from each other to open the same for insertion of a thread to be gaged and pivot towards each other into gaging position, and means to resiliently retain the gage members in exit position.

11. A thread ring gage comprising a frame, a pair of complementary gage members each having a threaded concave portion, means carried by the frame and pivotally supporting each gage member at spaced points so that the concave gaging portions pivot away from each other to open the same for insertion of a thread to be gaged and pivot towards each other in a reverse direction through gaging position and beyond to exit position to release the gaged part on the other side thereof, means normally retaining the gage members in open position, means for retaining the gaging members in exit position, and means to render the next aforesaid means effective or ineffective.

12. A thread ring gage comprising a frame having an arcuate surface, a pair of complementary gage members each having a threaded concave portion, means carried by the frame and pivotally supporting each gage member at spaced points so that the concave gaging portions pivot away from each other to open the same for insertion of a thread to be gaged and pivot towards each other in a reverse direction through gaging position and beyond to exit position to release the gaged part on the other side thereof, and a spring for each gage member having one end secured to the same and the other end sliding along the arcuate surface, for normally retaining the gage members in open position.

13. A thread ring gage comprising a frame having an arcuate surface, a pair of complementary gage members each having a threaded concave portion, means carried by the frame and pivotally supporting each gage member at spaced points so that the concave gaging portions pivot away from each other to open the same for insertion of a thread to be gaged and pivot towards each other in a reverse direction through gaging position and beyond to exit position to release the gaged part on the other side thereof, a spring for each gage member having one end secured to the same and the other end being free and sliding along the arcuate surface for normally retaining the gage members in open position, and a recess positioned in the arcuate surface to be engaged by the free end of the spring for retaining the gaging members in exit position.

14. A thread ring gage comprising a frame having an arcuate surface, a pair of complementary gage members each having a threaded concave portion, means carried by the frame and pivotally supporting each gage member at spaced points so that the concave gaging portions pivot away from each other to open the same for insertion of a thread to be gaged and pivot towards each other in a reverse direction through gaging position and beyond to exit position to release the gaged part on the other side thereof, a spring for each gage member having one end secured to the same and the other end being free and sliding along the arcuate surface for normally retaining the gage members in open position, a recess positioned in the arcuate surface to be engaged by the free end of the spring for retaining the gaging members in exit position, and a screw adjustable to positions where it renders the recess effective or ineffective.

15. A thread ring gage comprising a frame, a pair of complementary gage members each having a threaded concave portion, means carried by the frame and pivotally supporting each gage member at spaced points so that the concave gaging portions pivot away from each other to open the same for insertion of a thread to be gaged and pivot towards each other in a reverse direction through gaging position and beyond to exit position to release the gaged part on the other side thereof, a surface carried by the frame adjacent each gage member, and a spring for each gage member having one end secured to the same and the other end sliding along the surface for normally retaining the gage members in open position.

16. A thread ring gage comprising a frame, a pair of complementary gage members each having a threaded concave portion, means carried by the frame and pivotally supporting each gage member at spaced points so that the concave gaging portions pivot away from each other to open the same for insertion of a thread to be gaged and pivot towards each other in a reverse direction through gaging position and beyond to exit position to release the gaged part on the other side thereof, a surface upon the frame adjacent to each gage member, a spring for each gage member having one end secured to the same and the other end being free and sliding along the surface for normally retaining the gage members in open position, and a recess positioned in the surface to be engaged by the free end of the spring for retaining the gaging members in exit position.

17. A thread ring gage comprising a frame, a pair of complementary gage members each having a threaded concave portion, means carried by the frame and pivotally supporting each gage member at spaced points so that the concave gaging portions pivot away from each other to open the same for insertion of a thread to be gaged and pivot towards each other in a reverse direction through gaging position and beyond to exit position to release the gaged part on the other side thereof, a surface upon the frame adjacent to each gage member, a spring for each gage member having one end secured to the same and the other end being free and sliding along the surface for normally retaining the gage members in open position, a recess positioned in the surface to be engaged by the free end of the spring for retaining the gaging members in exit position, and a screw adjustable to positions where it renders the recess effective or ineffective.

18. A gage comprising a frame, a pair of complemental gage members each having a gaging means, means pivotally supporting each gage member at spaced points so that the gage members pivot away from each other and the gaging means open for insertion of a part to be gaged and pivot towards each other to bring the gaging means into gaging position, and means normally retaining the gage members in open position.

19. A gage comprising a frame, a first gage roller carried by the frame, a gage member, a pair of spaced gage rollers carried by the gage member, and means pivotally supporting the gage member at a spaced point from the first gage roller so that the gage member may pivot away from the first gage roller to open the gage rollers for insertion of a part to be gaged and pivot towards the gage roller to bring the pair of gaging rollers into gaging position with the first roller.

20. A gage comprising a frame, a first gage roller carried by the frame, a gage member, a pair of spaced gage rollers carried by the gage member, means pivotally supporting the gage member at a spaced point from the first gage roller so that the gage member may pivot away from the first gage roller to open the gage rollers for insertion of a part to be gaged and pivot towards the gage roller to bring the pair of gaging rollers into gaging position with the first roller, and means normally retaining the gage member in open position.

21. A gage comprising a frame, a pair of gage members, a pair of spaced gage rollers carried by each gage member, and means pivotally supporting each gage member upon the frame at a spaced point from the other so that each gage member may pivot away from the other to open the gage rollers for insertion of a part to be gaged and pivot towards the other gage member to bring the pairs of gaging rollers into gaging position.

22. A gage comprising a frame, a first gage roller carried by the frame, a gage member, a pair of spaced gage rollers carried by the gage member, means pivotally supporting the gage member upon the frame at a spaced point from the first gage roller so that the gage member may pivot away from the former to open the gage rollers for insertion of a part to be gaged and pivot towards the first gage roller to bring the pair of gaging rollers into gaging position, and means normally retaining the gage member in open position.

23. A gage comprising a frame, a plurality of complementary gage members at least one of which has a gaging portion for engaging a plurality of points upon the periphery of a test piece, means mounting each gaging member upon the frame, each gage member which has a gaging portion with a plurality of gaging points having a mounting means for pivotal movement thereof so that each such gage member may be moved away from the other for insertion of a test piece and moved to gaging position between the members, each pivotal mounting means supporting its gaging members for free pivotal movement in both directions by manual pressure exerted on the gage member, and the gaging members when in use being positioned with their gaging portions spaced apart a distance so that an oversize piece is incapable of passing to gaging position.

24. A gage for a test part having an axial sectional outline of differing radial dimensions which same outline continues circumferentially thereof, comprising a frame, a pair of complemental gage members each having a concave gaging portion the axial sectional outline of which has different radial dimensions which same outline continues circumferentially thereof to form a gaging surface complementary to the test part, and means pivotally supporting the respective gage members at spaced points so that the concave gaging portions pivot away from each other to open the same for insertion of the test part to be gaged and pivot towards each other in reverse direction into gaging position.

25. A gage for a test part having an axial sectional outline of differing radial dimensions which same outline continues circumferentially thereof comprising a frame, a pair of cooperating gage members having gaging portions at least one of which has a concave gaging portion, the axial sectional outline of each gaging portion having differing radial dimensions which same outline continues circumferentially thereof to form a gaging surface complementary to the test part, and means supporting the respective gage members at spaced points, and each gaging member with a concave gaging portion being pivotally supported so that it pivots away from the other gage member to open the gage for insertion of the test part to be gaged and pivots toward the other in reverse direction into gaging position.

PAUL W. JOHNSON.

REFERENCES CITED

The following references are of record in the file of this patent:

UNITED STATES PATENTS

| Number | Name | Date |
| --- | --- | --- |
| 1,949,767 | Thompson | Mar. 6, 1934 |
| 1,925,346 | Summers | Sept. 5, 1933 |
| 1,491,613 | Miller | Apr. 22, 1924 |
| 987,942 | Bariquand | Mar. 28, 1911 |